C. PRIEST.
APPARATUS AND METHOD FOR COUNTERACTING THE INDUCTANCE DISTURBANCES IN TELEGRAPH LINES.
APPLICATION FILED MAR. 23, 1911.
1,094,472.
Patented Apr. 28, 1914.
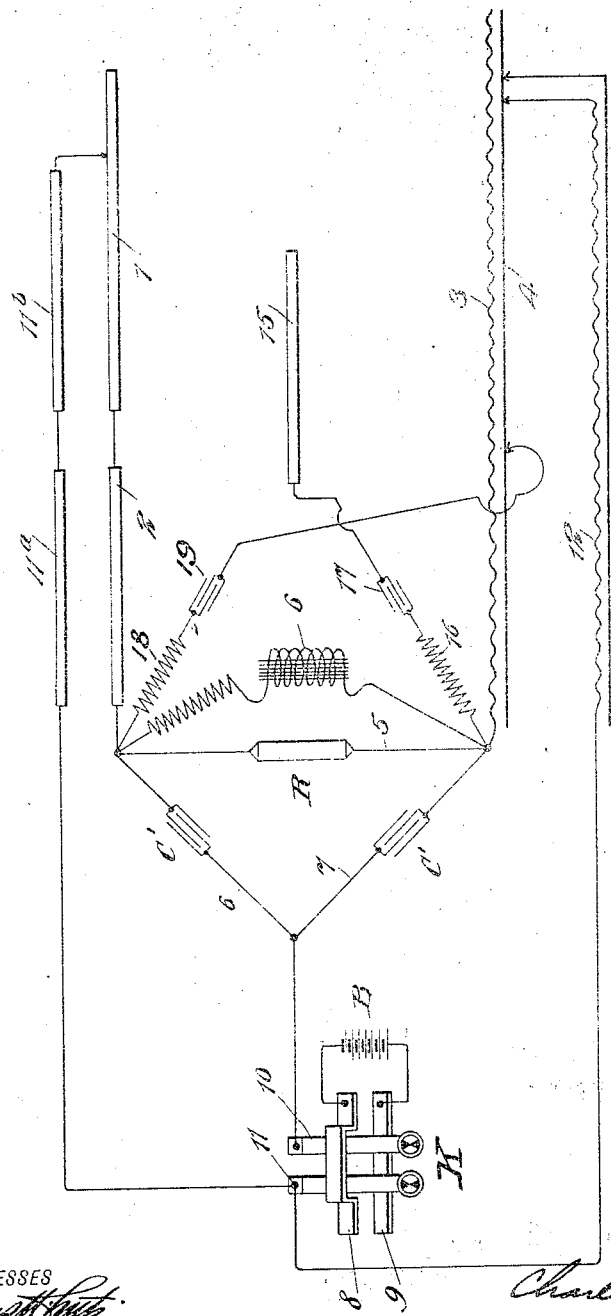

UNITED STATES PATENT OFFICE.

CHARLES PRIEST, OF ARLINGTON, NEW JERSEY, ASSIGNOR TO COMMERCIAL CABLE COMPANY, OF NEW YORK, N. Y., A CORPORATION OF NEW YORK.

APPARATUS AND METHOD FOR COUNTERACTING THE INDUCTANCE DISTURBANCES IN TELEGRAPH-LINES.

1,094,472.  Specification of Letters Patent.  Patented Apr. 28, 1914.

Application filed March 23, 1911. Serial No. 616,372.

*To all whom it may concern:*

Be it known that I, CHARLES PRIEST, a subject of the King of Great Britain, and resident of Arlington, county of Hudson, State of New Jersey, have invented certain new and useful Improvements in Apparatus and Methods for Counteracting the Inductance Disturbances in Telegraph-Lines, of which the following is a specification.

This invention relates to an apparatus by means of which the instrument used to receive the signals transmitted through submarine cables, under-ground or over-head land lines, is rendered immune from the disturbances, inductive or otherwise, caused by the proximity of other circuits, such as electric railway circuits, power or other electric circuits, atmospheric or other electrical disturbances. These disturbances, if not provided against, mutilate or destroy the signals transmitted through the said cables or land lines.

The drawing is a diagrammatic representation of one end of a duplex, submarine, telegraphic cable system, with my apparatus connected thereto.

I have shown my invention as applied to a duplex cable system or circuit, but the method is applicable to other systems and circuits, and I, of course, desire it understood that I am not to be limited to any specific application of the invention.

The disturbing effect of heavy currents in neighboring power or lighting circuits upon telegraph or telephone circuits may be eliminated by two methods. First by a process of shielding or protection, whereby the disturbing influences are prevented from reaching the signaling circuits; and second by a process or method of counterbalancing the effects of the disturbances. My invention pertains to this latter class. I found that to accomplish the desired result by the method of counterbalancing or compensating for the inductive or other disturbances it was necessary to find a source of current, which I define as a compensating line, which would provide in all cases a disturbance simultaneous with and in all respects equal to, and opposite in direction to the disturbance which mutilates the received signals. It was also necessary to determine the point at which this opposing disturbance could be introduced into the signal circuit without at the same time interfering with or otherwise hampering the normal use of the circuit for signaling purposes. I found that the best method of controlling and properly introducing these counterbalancing disturbances was by means of a condenser and a resistance in series with it through which the source of counterbalancing disturbance is connected to the side of the receiving instrument remote from that side by which the mutilated signaling currents arrive from the cable or other circuit.

Referring to the parts illustrated in the drawing, 1 designates the under-water portion of the main cable and 2 the underground land portion thereof, which continues the cable connection from the cable hut at the point where the main cable lands to the receiving apparatus at the cable office. The land portion of the cable is frequently many miles in length, and is the portion of the circuit in which the disturbing influence of the electric lighting and power circuits is chiefly felt. The artificial line is designated by the numeral 3, the earth plate of said artificial line being designated by 4. The end of the artificial line is connected to the end of the main cable through the bridge wire 5 of the usual Wheatstone bridge, the two arms 6 and 7 of the bridge being connected to the usual double or reversing key K in any suitable manner. The receiving instrument R is connected to the said bridge wire. This instrument may be a siphon recorder or any other suitable form of receiving instrument.

6 designates a magnetic shunt which is used to control and regulate the size and character of the ordinary signals arriving from the cable. In some cases a condenser in series with the receiving instrument is used instead of the shunt 6, and sometimes in addition to the said shunt. Condensers C' are arranged in the arms 6 and 7 of the bridge, said condensers being usually termed the block condensers. The poles of a battery B are connected to the strips 8 and 9 of the double key in the usual manner; and key levers 10 and 11 are connected to the line through the bridge arms and to earth, respectively. The key lever 11 is connected to earth a considerable distance at sea, as indicated in the diagram. The connection between key 11 and the sea earth consists of a section of under-ground cable 11ª corresponding to the section 2 of the main cable, and a short section 11ᵇ of submarine cable. It is true that the section of under-ground cable connected to the key 11 is exposed to the same disturbances as the section 2 of the main cable, but inasmuch as it is connected to a point where it has a perfectly symmetrical relation to both ends of the receiving apparatus, the final effect of the disturbances arising in it may be neglected as their effect on the receiving apparatus is rendered *nil* by precisely the same apparatus that is provided to make duplex working possible, that is by the apparatus which prevents the signals which enter one end of a cable from affecting the receiving apparatus situated at the same end. Key lever 11 is also connected to an artificial line 12, providing an electrical equivalent of the under-ground section 11ª and the short submarine section 11ᵇ.

The apparatus just described is the well-known arrangement of a duplex cable system or working, for the simultaneous transmission of messages in both directions through the cable.

As hereinbefore stated the inductive or other disturbances of the receiving instrument are due to the extraneous electrical influences upon the land portion of the main cable. If, therefore, corresponding inductive disturbances are produced at that end of the bridge wire connected to the artificial line said disturbances would balance each other and be so neutralized or compensated for as to not affect the receiving instrument, or at least affect it to such a slight extent as to not interfere with the proper reading of the signals. To accomplish this I connect to the bridge wire at or adjacent its connection to the artificial line a section 15 of insulated under-ground cable corresponding precisely with the insulated under-ground portion of the main line cable and subject to the same extraneous electrical influences. This section of cable serves in the capacity of a source of electrical disturbances and forms what I term a compensating line. This section of cable is employed solely as a source of counterbalancing or compensating disturbances, inductive or otherwise. It will, of course, be understood that this compensating line, or source of inductive disturbances, may be of any form and may be placed in any position, it being desirable that it shall deliver to the receiving instrument on the side remote from the main line connection the same form of disturbances as are delivered to the receiving instrument from the main line cable. I have found it convenient and entirely satisfactory to use as a compensating line a section of insulated under-ground cable corresponding precisely in length, diameter and character of insulation with the section 2 of the main line cable. Of course, it is to be understood that any other arrangement may be employed, or any other source of compensating disturbances may be used. I have found it in some forms of apparatus desirable that the outer end of the compensating line shall be sealed or insulated in order to prevent the escape or dissipation of the induced currents therein, and in order to prevent the said compensating line being influenced by local earth currents. Between the compensating line and the receiving instrument I insert an adjustable resistance 16 and an adjustable condenser 17. The disturbances created at any point in the underground cables divide and flow in both directions, that is from the point of origin of the disturbance toward the receiving instrument and from the same point toward the main cable. Inasmuch, however, as the conditions at the far ends of the under-ground cables 2 and 15 are quite dissimilar, it follows that the amount of disturbance reaching the receiving instruments from these two sources is different in the two cases. The resistance 16 and condenser 17 afford the necessary means of restoring the equality between the two sets of distrubance.

In a simplex system and also when using a duplex system for transmission in one direction only, it is only necessary to use the compensating line with its adjustable condenser and resistance. When, however, it is desired to use the system in its duplex capacity provision must be made for balancing the lines. It is manifest that the insertion of the compensating line or the source of compensating disturbances with its condenser and resistance, will so disturb the balance of the main and artificial lines as to entirely destroy the duplex character of the system. To restore this balance I connect to the main line end of the bridge wire a corresponding adjustable resistance 18 and an adjustable condenser 19, the said condenser and resistance being in series, and the condenser being connected to the earth plates of the artificial line, as clearly indicated in the drawing. By this means the balance of the lines is completely restored.

The exact nature of the source of counteracting disturbances will depend entirely on the nature and source of the disturbances to be counterbalanced. If that disturbance arises from a local trolley circuit a local earth connection will serve. If the disturbances can be traced to any particular source a direct connection to that source will suffice. I have found the arrangement described herein practically eliminates the inductive and other disturbances in the receiving instrument, or at least reduces them to such an extent that they do not interfere with the proper reading of the signals.

Having thus fully described my invention, what I claim as new and desire to secure by Letters Patent, is:

1. An electric signaling system comprising a main line subject to extraneous electrical inductive disturbances, a receiving instrument connected to said line, a source of extraneous inductive disturbances of like character to those affecting the main line and directly and independently connected to the receiving instrument on the opposite side thereof from the main line connection, the two sources of inductive disturbances being independent of each other and unaffected by each other outside of the receiving instrument, whereby the inductive disturbances picked up by the main line and the similar disturbances from the compensating source will pass to the receiving instrument unaffected and independently of each other and in opposite directions and will be balanced or neutralized in said instrument.

2. An electric signaling system comprising a main line subject to extraneous electrical inductive disturbances, a receiving instrument connected to said line, an insulated wire serving as a compensating line and corresponding to a portion only of the main line, said wire being independent of the main line and subject to extraneous inductive disturbances of like character to those affecting the main line, the compensating line being independently connected to the receiving instrument on the opposite side thereof from the main line connection, the inductive disturbances picked up by the main line being unaffected by the corresponding inductive disturbances picked up by the compensating line, said disturbances flowing to the receiving instrument in opposite directions and balancing or neutralizing each other in the receiving instrument.

3. A duplex telegraph system comprising a main line subject to extraneous electrical disturbances, an artificial line, a receiving instrument connected to both of said lines, and a compensating line connected to the receiving instrument on the opposite side thereof from the main line connection and subject to extraneous electrical disturbances similar to those affecting the main line.

4. A duplex telegraph system comprising main and artificial lines, a receiving instrument connected to both of said lines, a compensating line connected to the receiving instrument on the opposite side thereof, from the main line connection, a resistance and a condenser interposed between the compensating line and the receiving instrument, a resistance and a condenser connected to the receiving instrument at the main line connection thereof and means connecting this latter condenser to the earth plate of the artificial line.

5. A cable telegraph system comprising an under-water portion and an under-ground portion, a receiving instrument connected to the free end of the under-ground portion, an insulated compensating cable corresponding to the under-ground portion of the main line cable and arranged to be subject to the same extraneous electrical influences, the outer or free end of said compensating cable being sealed or insulated, the inner end of said cable being connected to the receiving instrument on the opposite side thereof from the main line conductor.

6. A duplex cable system comprising a main under-water section, an under-ground or land section, an artificial line, a receiving instrument connected to both of said lines, a compensating cable corresponding in length to the under-ground portion of the main line and arranged to be subject to the same extraneous electrical influences and connected to the artificial line end of the receiving instrument, a condenser and a resistance interposed between said compensating cable and the receiving instrument, the outer end of the said cable being sealed or insulated, a resistance and a condenser connected to the receiving instrument at the main line end thereof, said condenser being also connected to the earth plate of the artificial line.

7. A duplex telegraph system comprising a main line subject to extraneous electrical disturbances, an artificial line, a receiving instrument connected to both of said lines, and a source of compensating electrical disturbances connected to the receiving instrument on the opposite side thereof from the main line connection and similar to the extraneous electrical disturbances affecting the main line, whereby the extraneous electrical disturbances in the main line will be balanced by similar disturbances connected to the opposite side of the receiving instrument.

8. A duplex telegraph system comprising a main line, an artificial line, a receiving instrument connected to both of said lines, and a source of compensating electrical disturbances connected to the receiving instrument on the opposite side thereof from the main line connection, and means connected to the receiving instrument on the same side thereof of with the main line connection to maintain the duplex working balance in the lines.

9. A duplex telegraph system comprising a main line subject to extraneous inductive disturbances, an artificial line, a receiving instrument connected to both of said lines and a source of compensating extraneous inductive disturbances connected to the receiving instrument on the opposite side thereof from the main line connection and balancing the extraneous inductive disturbances in the main line.

10. A duplex telegraph system comprising a main line subject to inductive disturbances, an artificial line, a receiving instrument connected to both of said lines and a source of compensating inductive disturbances connected to the receiving instrument on the opposite side thereof from the main line connection and balancing the inductive disturbances in the main line, and means conected to the receiving instrument on the same side thereof with the main line connection to maintain the duplex working balance.

11. The method of counteracting the extraneous inductive disturbances in telegraph lines which consists in connecting to the receiving instrument on the opposite side thereof from the main line connection a source of compensating extraneous electrical disturbances similar in character to the extraneous electrical disturbances affecting the main line, whereby the disturbing influences will be balanced in the receiving instrument.

12. A cable telegraph system comprising a main line wire, a receiving instrument connected to the main line, an insulated compensating wire arranged to be subject to the same extraneous electrical influences affecting the main line and connected to the receiving instrument on the opposite side thereof from the main line connection, a condenser and a resistance interposed between said compensating line and the receiving instrument, the outer end of said compensating line being sealed or insulated, for the purpose set forth.

13. A duplex cable system comprising a main line, an artificial line, a receiving instrument connected to both of said lines, a compensating line arranged to be subject to the same extraneous electrical influences affecting the main line and connected to the artificial line end of the receiving instrument, a condenser and a resistance interposed between said compensating line and the receiving instrument, the outer end of said compensating line being sealed or insulated and a resistance and a condenser connected to the receiving instrument at the main line side thereof, said condenser and resistance being also connected to the earth plate of the artificial line.

14. A telegraph system comprising a main line wire, a receiving instrument connected to the main line and provided with an earth connection on the opposite side thereof from the main line connection, a compensating wire or conductor, said compensating wire being arranged to be subjected to the same extraneous electrical influences affecting the main line wire and connected to the receiving instrument on the opposite side thereof to the main line conductor and extending for only a portion of the length of the main line, whereby the impulses of current picked up by said compensating line flow to the receiving instrument and neutralize the disturbing impulses picked up by the main line.

15. A telegraph system comprising a main line wire, a receiving instrument connected to the main line and provided with an earth connection on the opposite side thereof from the main line connection, a compensating wire or connector arranged to be subjected to the same extraneous electrical influences affecting the main line wire and connected to the receiving instrument on the opposite side thereof from the main line conductor, said compensating wire being insulated at its outer end, a resistance and a condenser interposed in said compensating line near its connection with the receiving instrument.

16. An electric signaling system comprising a main line subject to extraneous electrical inductive disturbances, a receiving instrument connected to said main line, an insulated source of compensating extraneous electrical inductive disturbances free of the main line normal currents and connected to the receiving instrument on the opposite side thereof from the main line, a condenser and a resistance interposed between the source of compensating inductive disturbances and the receiving instrument, and an artificial cable connected to the same side of the receiving instrument as the insulated source of compensating inductive disturbances said artificial cable having the usual earth plate.

In testimony whereof I hereunto affix my signature in the presence of two witnesses.

CHARLES PRIEST.

Witnesses:
WM. R. DAVIS,
F. R. MILLER.